April 7, 1964 — A. C. BAILEY — 3,128,066
LANDING PLATFORM
Filed Oct. 31, 1960 — 2 Sheets-Sheet 1
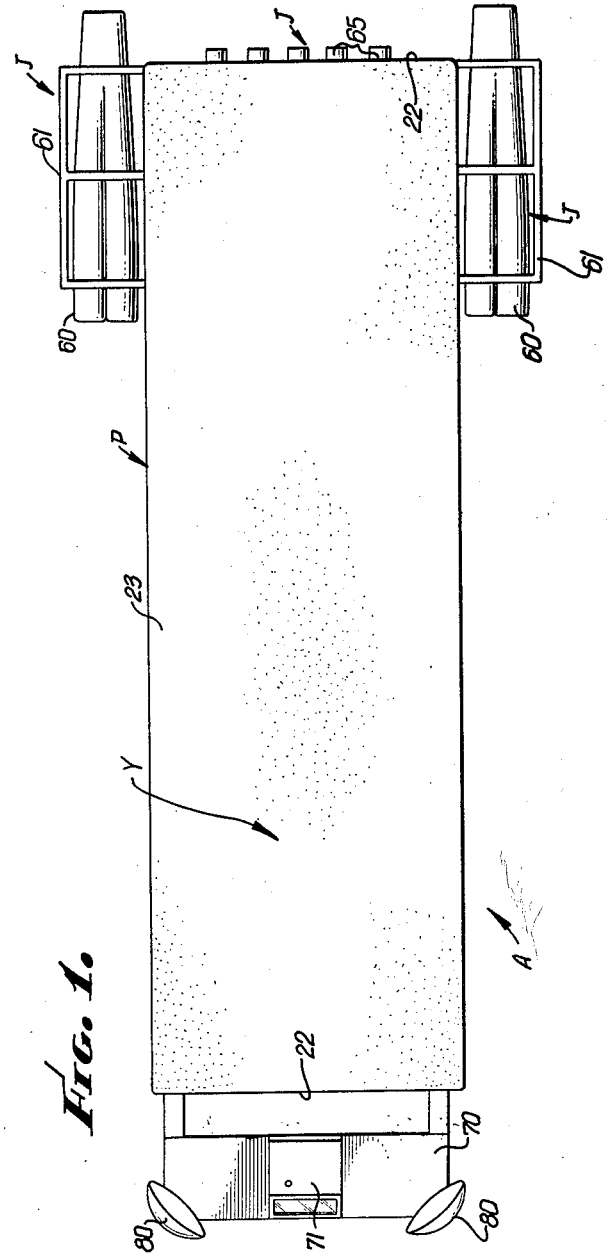
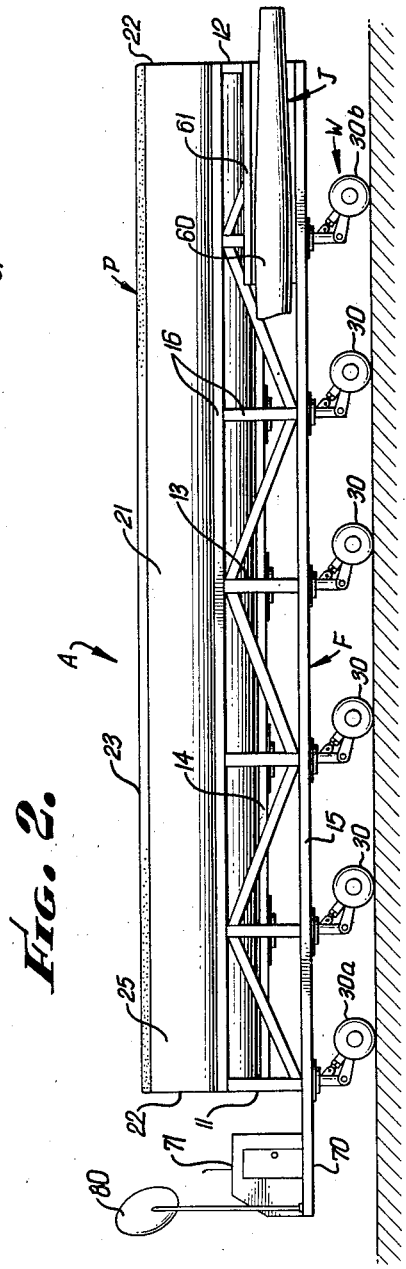
INVENTOR.
ALBERT C. BAILEY
BY
AGENT.

April 7, 1964  A. C. BAILEY  3,128,066
LANDING PLATFORM
Filed Oct. 31, 1960  2 Sheets-Sheet 2
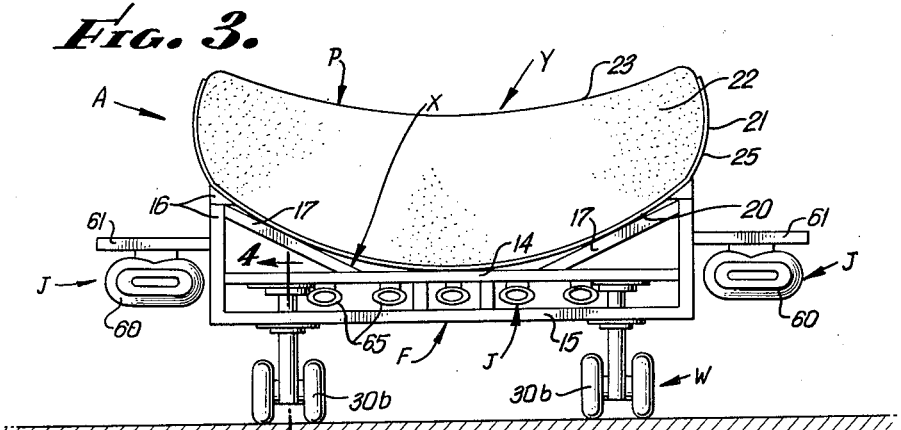
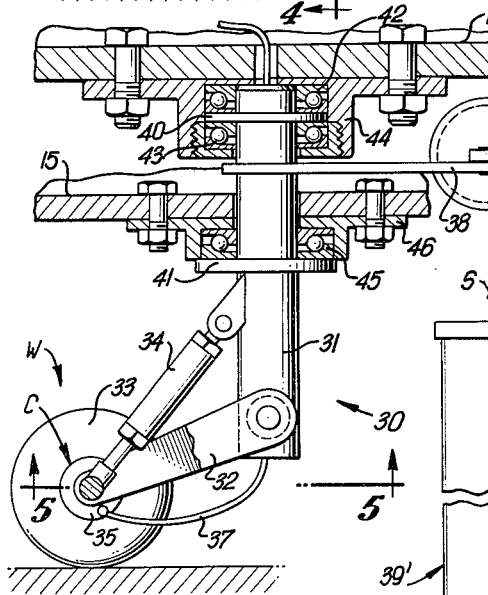
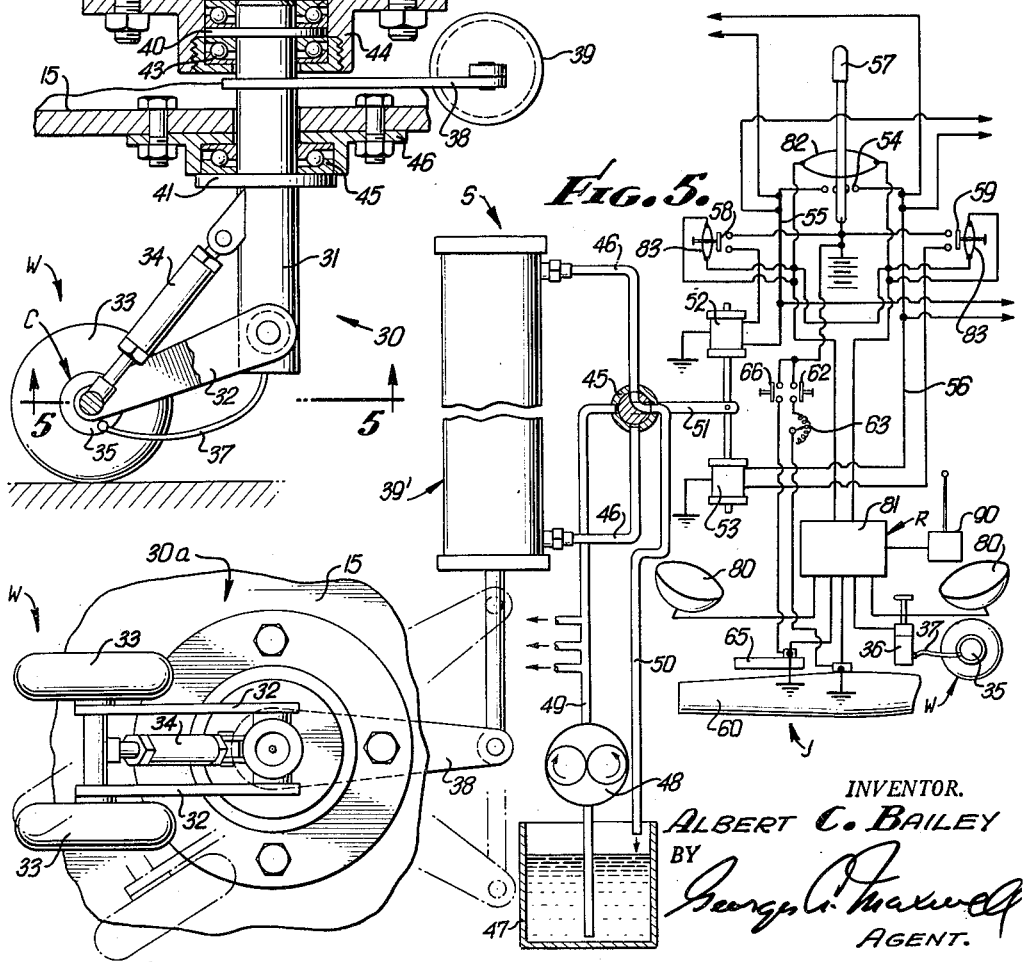
INVENTOR.
ALBERT C. BAILEY
BY
AGENT.

United States Patent Office 3,128,066
Patented Apr. 7, 1964

3,128,066
LANDING PLATFORM
Albert C. Bailey, 1570 E. Howard St., Pasadena, Calif.
Filed Oct. 31, 1960, Ser. No. 66,010
4 Claims. (Cl. 244—114)

This invention relates to a landing platform and is more particularly concerned with a mobile platform adapted to be driven along an aircraft landing strip to intercept and support an aircraft descending towards the strip on a landing run.

Modern aircraft are equipped with retractable hydraulically or electrically operated landing gear. The landing gear of the modern aircraft includes generally, wheels and struts, or the like carrying the wheels and pivotally connected with the aircraft, and means for selectively shifting the struts, with the wheels, from a down position where the wheels serve to support the aircraft above the ground, to an up or retracted position where the struts and wheels occur within the fuselage, wing structure, or a suitable nacelle in the aircraft and so that the landing gear does not afford any wind resistance during flight.

It has been clearly established that the major cause of damage to and loss of aircraft is due to failure of the landing gear to properly shift from its retracted position to its down position preparatory to landing. When the landing gear fails to function properly it becomes necessary to make an emergency or belly landing, that is, land the plane so that the underside of the fuselage thereof slidably engages the landing strip, or, when possible, ditch or abandon the plane in flight and let the abandoned plane crash. This latter procedure is followed whenever possible since there is less danger of bodily harm to the occupants of the aircraft.

When a plane is successfully belly landed, the cost of repair, if repair is possible, is at least one quarter the original cost of the aircraft. Accordingly, if a four million dollar jet airliner is successfully belly-landed, the cost of repair is at least one million dollars. It is to be noted, however, that the chances of a successful belly landing without substantial or total destruction of the aircraft is less than fifty percent.

The loss of aircraft and the cost of aircraft repairs experienced each month, as a result of landing gear failure, including civilian, commercial and military aircraft, amounts to many millions of dollars, the military having the greatest, but least published, experience.

An object of my invention is to provide a novel, mobile, landing platform adapted to be advanced or run along an aircraft landing strip to occur below a crippled aircraft descending to land and which serves to catch and stop the aircraft safely and with a minimum of damage to the aircraft, and minimum risk of bodily harm to the occupants thereof.

The prior art has provided mobile landing platforms for the same purpose for which our new platform is intended, but has failed to provide such a platform which is sufficiently versatile and maneuverable to dependably achieve the desired end.

The platforms provided by the prior art have been such that they run in one direction only and along a predetermined path. That is, their longitudinal disposition and their direction of travel with respect to the longitudinal extent of the landing strips along which they operate is fixed and cannot be varied.

As a result of the above, it is necessary that the pilot direct and guide the aircraft onto the platform as it runs along the landing strip. Should the pilot miscalculate or misjudge any one of the many factors involved in such an operation, the landing platform becomes more of a hindrance than an aid, and might serve only to spill and/or dump the plane, rather than catch it safely.

An object of my invention is to provide a highly versatile and maneuverable landing platform for disabled aircraft which is such that it is directed and maneuvered to position itself beneath the aircraft as the aircraft descends.

Another object of the present invention is to provide a landing platform of the character referred to which is such that it can be shifted to travel diagonally of the longitudinal axis of the landing strip, with the longitudinal axis of the platform remaining parallel with the axis of the landing strip, and such that it can travel parallel with the axis of the landing strip with its longitudinal axis angularly related to the axis of the said strip.

Still another object of the present invention is to provide novel suspension means for a mobile landing platform of the character referred to.

It is a further object of my invention to provide novel means for steering and directing the platform and novel means for guiding and positioning the platform below a descending aircraft.

An object of my invention is to provide a landing platform of the character referred to having a novel heat and fire resistant and shock absorbing aircraft supporting pad.

The various objects and features of my invention will be fully understood from the following detailed description of a typical preferred form and application of my invention, throughout which description reference is made to the accompanying drawings, in which:

FIG. 1 is a plan view of the platform provided by the present invention;

FIG. 2 is a side elevational view of our new landing platform;

FIG. 3 is a rear end elevational view of the structure that I provide;

FIG. 4 is an enlarged detailed sectional view taken as indicated by line 4—4 on FIG. 3; and, FIG. 5 is a view taken as indicated by line 5—5 on FIG. 4 and having a diagram of the control system for the platform related thereto.

The platform A that I provide is adapted to be operated along an aircraft landing strip, or the like, to intercept and catch a descending aircraft, and includes generally, an elongate rectangular frame F, a pad P supported and carried by the frame F, wheel support means W for the frame, and propulsion means J carried by the frame and adapted to move the platform. In addition to the foregoing, the platform A includes steering means S related to the support means W, and radar control means R related to the steering means and the propulsion means and operable to properly orient the platform with respect to speed, direction and disposition of a descending aircraft and to intercept said aircraft as it approaches the landing strip.

The construction further includes suitable braking means C related to the wheel supporting means W which can be selectively manually controlled or under control of the radar means R.

The frame F that I provide, of the platform A, is an elongate, rectangular, metal framework having front and rear ends 11 and 12 and longitudinal sides 13. The frame F can be made up of any suitable stock, such as I-beams, angle sections, straps and the like. The frame is a rigid structure and in the preferred form of the invention has vertically spaced horizontally disposed top and bottom sections 14 and 15. The top section 14 is provided with upwardly projecting extensions 16 at each side and coextensive with the longitudinal extent of the frame. The extensions 16 on the frame have laterally inwardly projecting and downwardly inclined supports 17 which cooperate with the top section 14 to establish a longitudinal upwardly disposed channel X.

It will be apparent that in practice, the structural design of the frame F can vary widely without affecting the novelty of the invention. Accordingly, I will not burden this specification with further unnecessary detailed description thereof.

The pad P supported by the frame F is an elongate, rectangular body or unit, coextensive with the top of the frame and has a bottom surface 20, substantially vertically disposed side and end surfaces 21 and 22 and a top surface 23.

The pad P is semi-circular in cross section so that the bottom surface 20 thereof seats in the channel X established by the frame and so that the top surface 23 thereof establishes a longitudinal upwardly disposed saddle Y.

The pad P is a soft, yielding, shock absorbing unit and in practice can be established by a plurality of pneumatic or foam plastic cushion-like sections, or can, as illustrated, be established of a single unitary body of semi-rigid, plastic foam.

In the case illustrated the pad P is established by filling a light-weight sheet metal shell arranged in the channel X of the frame, with a suitable plastic foam. The plastic is introduced into the shell 25 by means of a suitable mixing nozzle and is allowed to set and cure in the shell. After the foam has set, the side portion of the shell 25 can be removed and the top surface 23 of the pad can be suitably trimmed and sculptured to establish the desired cradle-like configuration.

In practice, the firmness of the plastic can be easily and conveniently controlled in accordance with standard chemical procedures and can be made fireproof by employing a blowing agent which generates a non-combustible gas.

The shell 25 is fixed to the frame F in any suitable manner, and the pad P, formed in the shell, is bonded thereto, with the result that the pad is rigidly secured to the frame and is not subject to being displaced therefrom.

The wheel support means W that I provide includes a plurality of like unitary caster type wheel assemblages or units 30 arranged along each side portion of the bottom section 15 of the frame. In the case illustrated, I have shown six wheel units 30 along each side of the frame F. The front and rear untils 30 hereinafter designated as 30ª and 30ᵇ, respectively, while in most respects are identical with the intermediate units 30, are related to the steering means S, as will hereinafter be described.

In practice, the units 30, 30ª and 30ᵇ are surplus aircraft landing gear, suitably modified for application to the platform. Accordingly, the units can, in practice, vary considerably in details of construction. In the drawings, we have illustrated the units in a general manner and of the type of aircraft landing gear that is most desirable or preferred.

Each wheel unit is shown as including an elongate vertically disposed column 31, a laterally and rearwardly extending yoke 32 pivotally secured to the lower end of the column 31, a pair of pneumatic wheel and tire assemblages 33 rotatably mounted on the outer or rear ends of the yoke, and a pneumatic cylinder and ram type shock absorber 34 extending diagonally between the outer end of the yoke 32 and the column 31 at a point spaced above the pivotal connection between the yoke and the column. The wheel assemblages 33 of each of said units have a hydraulic braking unit 35 related thereto, which units are supplied with fluid under pressure from a suitable master cylinder 36, illustrated diagrammatically in FIG. 5 of the drawings. The fluid from the cylinder 36 is conducted to the braking units 35 through suitable hoses 37, which hoses can, as illustrated, extend through the columns 31 which columns are tubular. The braking units 35, cylinder 36 and hoses 37 related thereto constitute the braking means C.

The upper end portion of the column 31 is provided with a lateral arm 38 which is connected with a pneumatic cylinder and ram-type snubber 39. The arm 38 and snubber 39 establish a shimmy dampening means, that is, a means to prevent the unit from oscillating, in an arc, about the axis of the column 31, as it is operated along the landing strip. The snubber 39 is such that it will not prevent slow uniform pivoting of the columns 31, but will prevent the slightest rapid oscillation thereof.

The portions of the wheel units thus far described are typical of a class or type of aircraft landing gear which is standard or conventional and which is readily available as surplus and at very low cost.

The units, as modified, have vertically spaced horizontally disposed annular supporting flanges 40 and 41. The uppermost flange 40 is positioned adjacent the upper end of the column 31 and is rotatably supported by anti-friction bearings 42 and 43 adjacent its upper and lower surfaces, which bearings are carried in a suitable housing 44 secured to the underside of the top section 14 of the frame F. The lower flange 41 occurs below the bottom section 15 of the frame F. The top surface of the flange 41 engages and is rotatably supported by an anti-friction bearing 45, which bearing is carried by a suitable housing 36, secured to the under side of the bottom section of the frame. Each of the bearings 42 and 43 and 45, are combination axial and thrust bearings, and, in addition to engage the flanges 40 and 41, engage about the exterior of the column 31.

With the above relationship of parts it will be apparent that the several wheel units are mounted for free pivotal movement, are such that the wheels can be shifted vertically a sufficient extent to compensate for irregularities in the surface over which the platform is operated, and serve to provide adequate support for the platform and an aircraft supported on the platform.

The front and rear wheel units 30ª and 30ᵇ at the front and rear corners of the platform, and with which the steering means S is related, are alike in all respects to the intermediate units 30, except that the snubbers 39 related to the arm 38, while in FIG. 5, I have shown piston units 39'.

In FIG. 4 of the drawings I have shown a snubber 39 related to the arm 38, while in FIG. 5, I have shown a double-acting cylinder and piston unit 39' related to the arm 38.

The snubbers 39 and the double-acting cylinder and piston units 39' are suitably secured to the frame in fixed position, in any desired manner.

The steering means S, in addition to the double-acting cylinder and piston unit 39', related to each wheel unit 30ª and 30ᵇ, includes a double acting control valve 45 related to each unit 39', and connected with the opposite ends of the unit 39' by flow lines 46. The valve 45 is operable to selectively introduce fluid into one end or the other of the unit 39' and to exhaust fluid from the opposite end of the unit 39'. The means S further includes a reservoir 47 and a central hydraulic pumping unit 48 pumping fluid from the reservoir 47, a delivery line 49 from the pumping unit 48 and delivering fluid under pressure to each valve 45, and a return line 50 extending from each valve to the reservoir.

Each valve 45 is provided with a suitable operating means such as an arm 51, which arm is selectively actuated by a pair of solenoids 52 and 53 from a normal, neutral position, as shown in FIG. 5 of the drawings, to a position where fluid is delivered to one or the other end of the cylinder and piston unit 39, and is exhausted from the opposite end thereof.

The solenoids 52 and 53 are under control of a suitable double pole switch 54, one leg 55 of which is connected with the solenoid 52 and the other leg 56 of which is connected with the solenoid 53. The switch 54 is provided with a manual operating lever 57 for manually guiding the platform and is also under control of a suitable radar control means R for automatic guidance of the platform, as will hereinafter be described.

With the steering means S thus far described, it will be apparent that when each of the solenoids 52 and 53 is energized and the valves 45 and the cylinder and piston units 39' related thereto are actuated accordingly, the wheel units 30ª and 30ᵇ at the front and rear ends of the platform are turned or pivoted synchronously in the desired direction, with the result that the entire platform is caused to shift laterally in the desired direction across the landing strip, yet not change or alter the directions of th longitudinal axis of the platform. By controlling the direction of travel in the above manner it is possible to shift the platform laterally of the landing strip while maintaining it parallel with said landing strip and so that it can be accurately positioned in the path of a descending aircraft.

In addition to the above, the solenoids 52 and 53 related to the front wheel units 30ª are under independent control by means of switches 58 and 59. The switches 58 and 59, like the switch 57, can be operated manually or can be operated automatically by the radar guidance system R.

With the front wheel units under independent control of the switches 58 and 59, it will be apparent that the longitudinal axis of the platform can be shifted diagonally relative to the longitudinal axis of the landing strip as circumstances require.

With the steering means S that I provide, it will be apparent that the platform can be easily and conveniently maneuvered along a landing strip over which it is operated, in any desired direction and in any desired longitudinal disposition.

It will be apparent that when the wheel units 30ª and 30ᵇ are turned in a manner to change the direction and/or disposition of the platform as it travels along the landing strip, the intermediate caster type wheel units 30 will readily follow.

The propulsion means J that I provide includes one or more gas turbine or jet engines 60 at each side of the platform below the horizontal plane of the pad P, and with its discharge end disposed rearwardly. The jet engines 60 are secured to the frame by suitble mounting means 61 and are preferably arranged at the rear end portion of the frame. The jet engines 60 are under control of a suitable manually operable switch 62 and a variable resistance or rheostat 63, which rheostat is related to and controls the normal or conventional throttle means, not shown, provided with such engines. The throttle means of the jet engines 60 is also selectively controlled by the radar guidance system R.

In addition to the foregoing the propulsion means further includes a plurality of JATO units 65, that is, high thrust, solid fuel, rocket engines. The JATO units 65 are secured to the rear end 12 of the frame F and are disposed rearwardly. Each JATO unit 65 is, in accordance with normal practice, provided with an electrically operated igniter, not shown, which igniter is, in the instant case, under control of a suitable, manually operable switch 66. In addition, the igniters for the JATO units are also under control of the radar guidance system R.

In practice, when it is learned that a crippled aircraft is coming in, the jet engines 60 are put into operation and the brake units 35 of the braking means C are set. At the desired moment, when the aircraft is making its approach to the landing strip, the brakes 35 are released and one or more of the JATO units 65 are ignited. The JATO units 65 assist the jet engines to accelerate the platform to the desired speed, which is the approximate speed of the aircraft. By increasing or decreasing the speed and resulting thrust of the jet engines 60, by operating the braking means C and/or by igniting JATO units as desired, the platform can be rapidly and accurately brought to and maintained at the same speed as the aircraft and can be positioned beneath the aircraft with its longitudinal axis in parallel relationship with the axis of the body of the aircraft. Accordingly, as the aircraft descends, its body will be caught in the saddle Y established by the pad P of the platform. As the aircraft engages the platform the pad P and the shock absorbers 34 of the several wheel units, absorb the shock. Further, the pad P yields to the configuration of the aircraft in such a manner that the aircraft nests into the pad and is not subject to sliding and/or shifting thereon. As soon as the aircraft is caught by the platform, the braking means C can be actuated to slow the platform and bring it and the aircraft supported by it to rest.

In practice, and as illustrated, the lower section 15 of the frame F is provided with an extension 70 at its front end 11 which extension supports a suitable cab 71 in which the manually operable switches and components of the radar guidance system are housed, and in which one or more operators can ride. The radar guidance system R can vary widely in practive, and can be operatively coupled with the steering means S, propulsion means J and braking means C in any desired manner. The system R includes one or more radar antennas 80 mounted on the extension 70 at the forward end of the frame and disposed substantially rearwardly in fixed position relative to the longitudinal axis of the frame. In operation, the radar guidance system establishes and holds a fix on the approaching aircraft. The system R further includes a means for calculating the position, speed and direction of flight of an approaching aircraft, and means for transcribing the above information into electronic signals which energize the various switches and controls of the steering means S, propulsion means J and braking means C, so that the platform is accurately positioned beneath the said aircraft.

In the drawings, I have indicated the system R as including a box 81, in which the above mentioned means are contained, and have diagrammatically indicated, as at 82 and 83, an operative connection between the switches 54, 58 and 59, of the steering means and the system R. The JATO units 65, jet engines 60 and master cylinder 36 of the braking means C, are shown connected with the box 81 of the system R by suitable lines or looms, as the case may be.

Since the system R, and its relationship with the remainder of the construction that I provide, can vary widely in details of construction without affecting the novely of the present invention, I will not burden this application with further detailed description of the said system.

In practice, the pad P of the platform that I provide can be 40 to 50 feet wide, 150 to 175 feet long, and 10 to 15 feet thick. It has been determined that a platform having a pad of the foregoing dimensions can be safely and adequately propelled at speeds upward of 150 miles per hour with a pair of presently available jet turbine engines and can be accelerated to such a speed with the assist of several conventional JATO units, in less than three quarters of a mile. It has also been determined that a platform having a pad of the general dimensions referred to above, and capable of attaining the above mentioned speeds, can adequately and safely handle all conventional types of aircraft presently in service.

In the preferred carrying out of the invention, a suitable radio operated remote control unit 90 is related to the radar means R, so that the entire system can be put into service from a remote station, such as a control tower, when a crippled plane approaches, and that the platform can be maneuvered off of the landing strip and stopped after the aircraft is recovered, during which period the radar system R would be inoperative. In the case illustrated, the unit 90 is shown connected to the box 81 of the radar control system.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An aircraft landing platform of the character referred to including an elongate horizontally disposed, rectangular frame having front and rear ends, an upwardly disposed aircraft supporting pad fixed to and carried by the frame, supporting and guiding wheels at the four corners of the frame and a plurality of support wheels secured to the frame between the supporting and guiding wheels, steering means related to the supporting and guiding wheels and operable to selectively turn the four supporting and guiding wheels synchronously and to turn the two supporting and guiding wheels at one end of the frame independent of said wheels at the other end of the frame, propulsion means including gas turbine jet engines fixed to the frame and disposed rearwardly, braking means related to the several wheels, and control means related to the steering, propulsion and braking means to steer and propel the platform to occur below and catch a descending aircraft.

2. An aircraft landing platform of the character referred to including, an elongate horizontally disposed, rectangular frame having front and rear ends, an upwardly disposed aircraft supporting pad fixed to and carried by the frame, supporting and guiding wheels at the four corners of the frame and a plurality of support wheels secured to the frame between the supporting and guiding wheels, steering means related to the supporting and guiding wheels and operably to selectively turn the four supporting and guiding wheels synchronously and to turn the two supporting and guiding wheels at one end of the frame independent of said wheels at the other end of the frame, propulsion means including gas turbine jet engines fixed to the sides of the frame and disposed rearwardly, braking means related to the several wheels, manually operable control means related to the steering, propulsion and braking means to steer and propel the platform to occur below and catch a descending aircraft, and a radar guidance system carried by the platform adapted to establish a fix on a descending aircraft and to compute its speed, altitude and direction of travel and operatively coupled with the control means to selectively automatically control the direction and speed of the platform with respect to said aircraft to occur below and catch said aircraft.

3. An aircraft landing platform of the character referred to including, an elongate horizontally disposed, rectangular frame having front and rear ends, an upwardly disposed aircraft supporting pad fixed to and carried by the frame, supporting and guiding wheels at the four corners of the frame and a plurality of support wheels secured to the frame between the supporting and guiding wheels, steering means related to the supporting and guiding wheels and operable to selectively turn the four supporting and guiding wheels synchronously and to turn the two supporting and guiding wheels at one end of the frame independent of said wheels at the other end of the frame, propulsion means including gas turbine jet engines fixed to the sides of the frame and disposed rearwardly, braking means related to the several wheels, manually operable control means related to the steering, propulsion and braking means to steer and propel the platform to occur below and catch a descending aircraft, and a radar guidance system carried by the platform adapted to establish a fix on a descending aircraft and to compute its speed, altitude and direction of travel and operatively coupled with the control means to selectively automatically control the direction and speed of the platform with respect to said aircraft to occur below and catch said aircraft, said pad including a unitary body of deformable, non-flammable plastic foam and having longitudinally concaved top surface establishing a saddle to receive the fuselage of the aircraft.

4. An aircraft landing platform of the character referred to including, an elongate horizontally disposed, rectangular frame having front and rear ends, an upwardly disposed aircraft supporting pad fixed to and carried by the frame, supporting and guiding wheels at the four corners of the frame and a plurality of support wheels secured to the frame between the supporting and guiding wheels, steering means related to the four supporting and guiding wheels and operable to selectively turn the four supporting and guiding wheels synchronously and to turn the two supporting and guiding wheels at one end of the frame independent of said wheels at the other end of the frame, propulsion means including throttle controlled gas turbine engines fixed to the sides of the frame and disposed rearwardly, and braking means related to the several wheels, and a plurality of individually ignitable Jato rocket motors fixed to the rear end of the frame and disposed rearwardly, a control cab at the forward end of the platform, manually operable control means in the cab and related to the steering and braking means and related to the control of the jet engines and igniting means of the Jato rocket motors, and a radar guidance system carried by the platform adapted to establish a fix on a descending aircraft and to compute its speed, altitude and direction of travel and operatively coupled with the control means to selectively automatically control the direction and speed of the platform with respect to said aircraft to occur below and catch said aircraft.

References Cited in the file of this patent

UNITED STATES PATENTS

| | | |
|---|---|---|
| 2,246,716 | Bottrill | June 24, 1941 |
| 2,544,830 | Grill | Mar. 13, 1951 |
| 2,604,279 | Gerin | July 22, 1952 |
| 2,614,249 | Eaton | Oct. 14, 1952 |
| 2,765,650 | Youngclaus | Oct. 9, 1956 |
| 2,774,557 | Jakimiuk | Dec. 18, 1956 |
| 2,923,504 | Ortega | Feb. 2, 1960 |

FOREIGN PATENTS

| | | |
|---|---|---|
| 742,240 | Great Britain | Dec. 21, 1955 |